United States Patent
Zirkelbach et al.

(10) Patent No.: US 8,875,646 B2
(45) Date of Patent: Nov. 4, 2014

(54) MOORING/SHIPPING COVER

(75) Inventors: Donald A. Zirkelbach, Bradenton, FL (US); Charles Robert Withers, Bradenton, FL (US); Dennis J. Parniske, Parrish, FL (US)

(73) Assignee: Taylor Made Group, LLC, Gloversville, NY (US)

( * ) Notice: Subject to any disclaimer, the term of this patent is extended or adjusted under 35 U.S.C. 154(b) by 48 days.

(21) Appl. No.: 13/613,732

(22) Filed: Sep. 13, 2012

(65) Prior Publication Data

US 2013/0061795 A1 Mar. 14, 2013

Related U.S. Application Data

(60) Provisional application No. 61/534,287, filed on Sep. 13, 2011.

(51) Int. Cl.
*B63B 59/00* (2006.01)
*B60P 7/08* (2006.01)
*B63B 17/02* (2006.01)

(52) U.S. Cl.
CPC ............... *B60P 7/0876* (2013.01); *B63B 59/00* (2013.01); *B63B 17/02* (2013.01); *B63B 2221/12* (2013.01); *B63B 2221/14* (2013.01); *B63B 2241/24* (2013.01)
USPC .......................................... 114/361; 150/166

(58) Field of Classification Search
USPC ........ 114/343, 361, 364; 296/136.01, 136.07; 53/461; 150/166
See application file for complete search history.

(56) References Cited

U.S. PATENT DOCUMENTS

| | | | | |
|---|---|---|---|---|
| 5,228,408 A | * | 7/1993 | Jannausch | 114/361 |
| 5,291,848 A | * | 3/1994 | Wilhelm et al. | 114/361 |
| 5,564,358 A | * | 10/1996 | Newton | 114/361 |
| 5,673,961 A | | 10/1997 | Mazzarelli | |
| 5,890,448 A | * | 4/1999 | Berresford | 114/361 |
| 5,997,071 A | | 12/1999 | Mazzarelli | |

* cited by examiner

*Primary Examiner* — Lars A Olson
(74) *Attorney, Agent, or Firm* — Nixon & Vanderhye P.C.

(57) ABSTRACT

A boat cover for a boat includes a cover section that is sized to cover the deck from bow to stern and extending over the rub rail, and a shipping section attached to the cover section and sized to cover the hull from below the rub rail toward the chine. The shipping section is removable from the cover section. The boat cover eliminates waste as a shipping cover and is usable by the boat owner as a daily or long term storage, mooring and trailering cover.

18 Claims, 6 Drawing Sheets

MOORING/SHIPPING COVER

CROSS-REFERENCES TO RELATED APPLICATIONS

This application claims the benefit of U.S. Provisional Patent Application Ser. No. 61/534,287, filed Sep. 13, 2011, the entire content of which is herein incorporated by reference.

STATEMENT REGARDING FEDERALLY SPONSORED RESEARCH OR DEVELOPMENT (Not Applicable)

BACKGROUND OF THE INVENTION

The invention relates to boat covers and, more particularly, to a shipping cover for boats that includes features for additional functionality.

When a boat is shipped from a boat manufacturer, it is typically shipped with a disposable shipping cover, which is discarded by the dealer. Generally, the shipping cover is heat shrunk over the boat hull. The heat shrinking process adds time and expense to the shipping process. Additionally, discarding of the shipping cover amounts to additional expense and unnecessary waste. It would be desirable to design a cover that has functionality beyond shipping only and that is installable without requiring heat shrinking.

BRIEF SUMMARY OF THE INVENTION

A boat cover according to preferred embodiments is designed for use as a shipping cover, a mooring cover, a trailering cover, and a storage cover. The full cover for shipping protects the boat deck and hull to the boat chine from harsh road travel conditions. A portion of the boat cover is removable by the dealer or end user, and a portion of the cover is constructed for continued use after shipping allowing further use to the end consumer for several years.

In an exemplary embodiment, a boat cover for a boat includes a cover section that is sized to cover the deck from bow to stern and extending over the rub rail, and a shipping section attached to the cover section and sized to cover the hull from below the rub rail toward the chine. The shipping section is removable from the cover section. In one arrangement, the shipping section is constructed of a material that is more durable than the cover section. The shipping section is preferably attached to the cover section by a connector. Exemplary connectors include one of a sewn seam, a hook and loop fastener, a zipper, and a locking channel.

The cover section may include a tie channel adjacent a periphery thereof, where the boat cover may additional include a tension tie disposed in the tie channel and a ratchet tensioning mechanism cooperable with the tension tie. In this context, the tie channel may be positioned relative to the cover section such that the tie channel is positionable under the rub rail. The tie channel may be provided with a zippered access opening adjacent the ratchet tensioning mechanism.

Other features of the cover include safety straps extending from the cover section laterally underneath the hull, an integrated brow on a bow end thereof, cleat cutouts, vented openings, and cutouts for factory-installed bimini tops. The cover section may include an integrated sleeve containing a mushroom cap, where the boat cover includes a support pole positionable in the integrated sleeve in engagement with the mushroom cap.

In another exemplary embodiment, a two-section boat cover for use in shipping and covering a boat includes a cover section that is sized to cover a boat deck from bow to stern and extending to a mid-section of a boat hull, and a shipping section attached to the cover section and sized to cover the hull from below the mid-section of the boat hull toward a chine of the boat. The shipping section is removable from the cover section. The cover section includes a tie channel adjacent a periphery thereof, where the boat cover further includes a tension tie disposed in the tie channel and a ratchet tensioning mechanism cooperable with the tension tie.

In yet another exemplary embodiment, a method of using a multi-use boat cover for shipment and storage of a boat includes the steps of (a) preparing the boat for shipping by securing a cover section over the deck from bow to stern and positioning a periphery of the cover section over the rub rail, and at the same time, securing a shipping section over the hull from below the rub rail toward the chine, where the shipping section is removable from the cover section; and (b) when shipping is complete, preparing the boat for display, sale or use by separating the shipping section from the cover section, and continuing to use the cover section as a standard boat cover. Step (a) may be practiced by tensioning the tension tie under the rub rail with the ratchet tensioning mechanism.

BRIEF DESCRIPTION OF THE DRAWINGS

These and other aspects and advantages will be described in detail with reference to the accompanying drawings, in which.

DETAILED DESCRIPTION OF THE INVENTION

Figure 1:
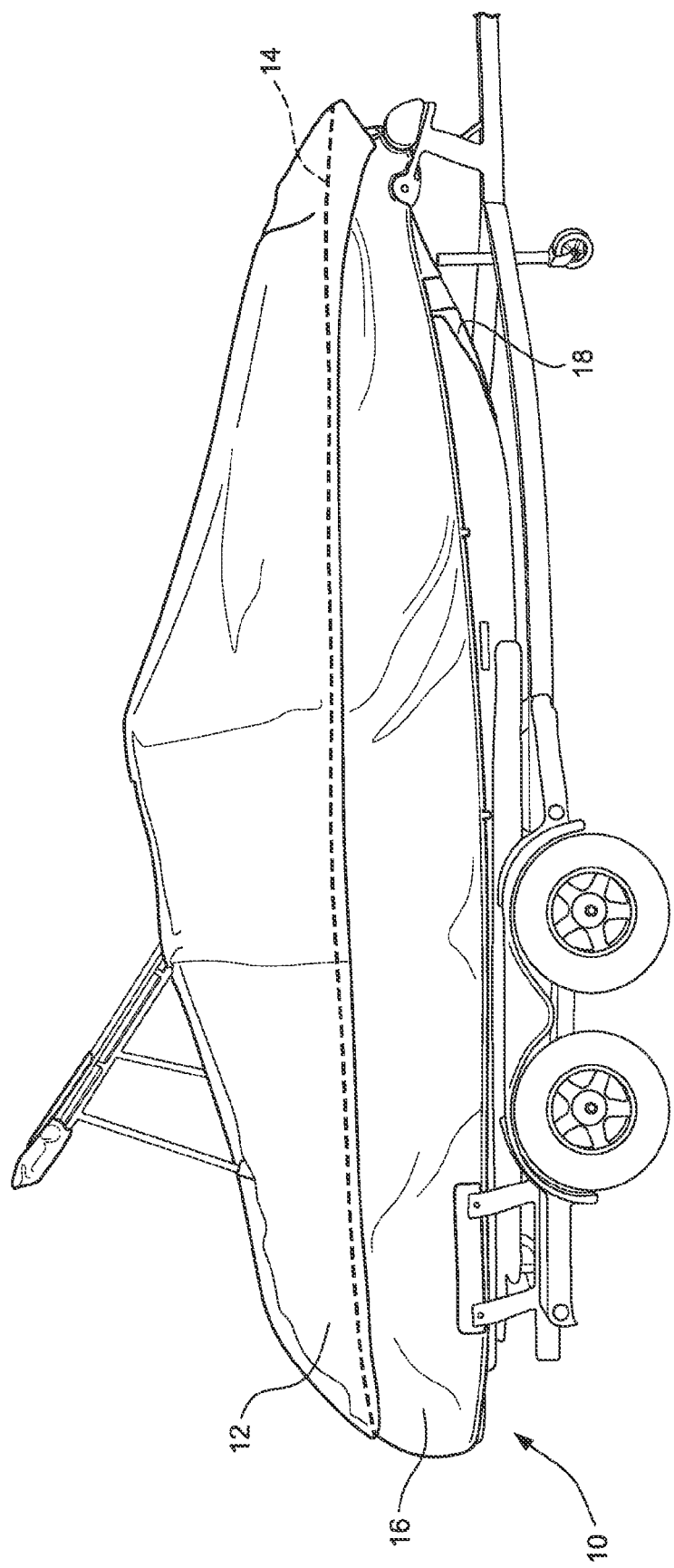
FIG. 1 shows the boat cover of the described embodiments in a shipping configuration.
Figure 2:
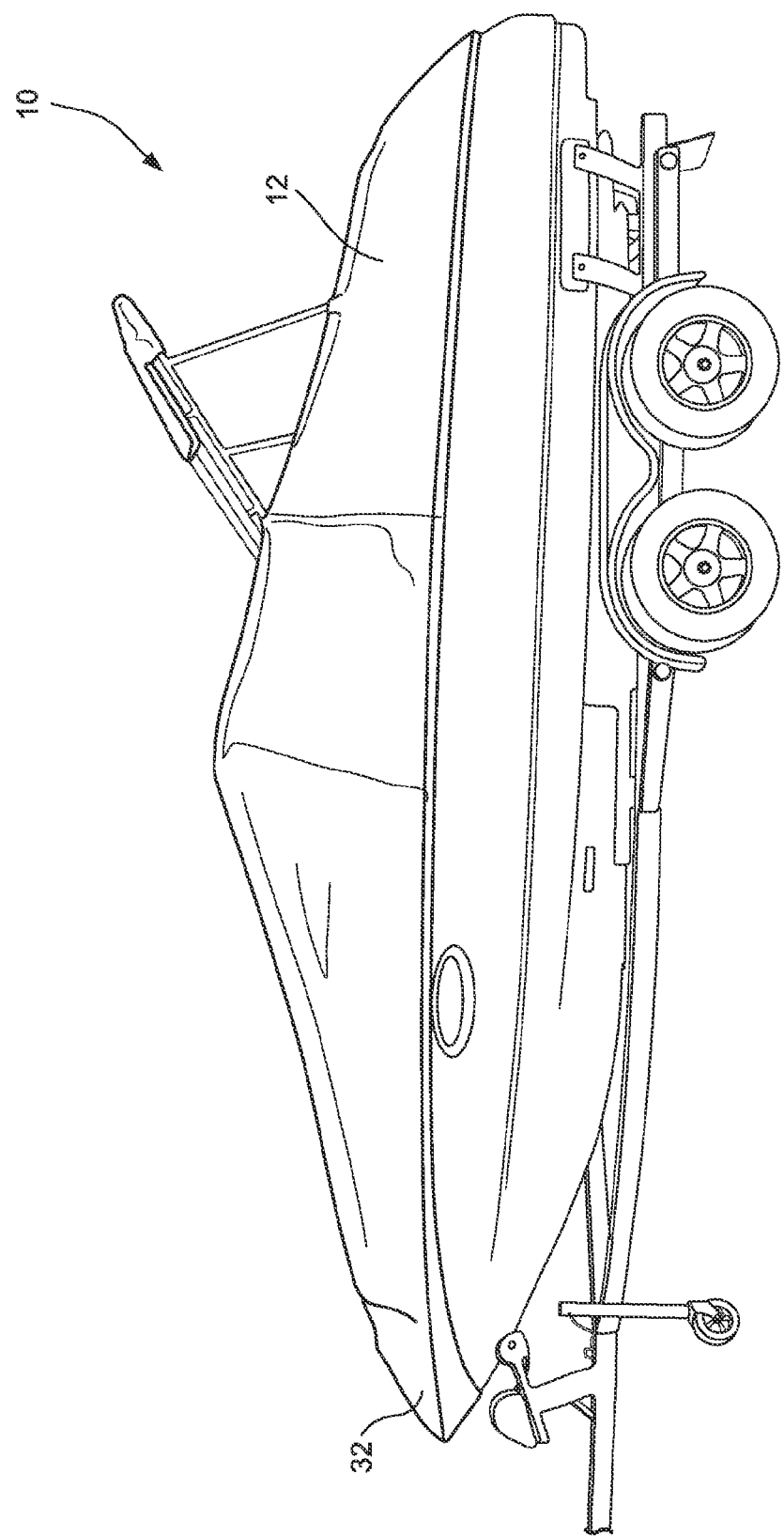
FIG. 2 shows the boat cover with the shipping section removed.

With reference to the drawings, a boat cover 10 is provided for a boat with typical parts including a hull extending from a rub rail to a chine and a deck. The cover includes a cover section 12 that is sized to cover the deck from bow to stern and extends over the rub rail 14. A shipping section 16 is attached to the cover section and is sized to cover the hull from below the rub rail 14 toward the chine 18. In some constructions, the shipping section 16 may extend all the way to the chine 18. Like a conventional shipping cover, the cover 10 protects the boat deck and hull from harsh road travel conditions.

In contrast with conventional shipping covers, however, with the boat cover 10 according to the described embodiments, the shipping section 16 is removable from the cover section 12. The shipping section 16 is secured to the cover section 12 via a connector such as a sewn seam. The material is sewn under the hem and can be easily cut under the hem with a pair of scissors, thus leaving the cover section 12 at the rub rail 14. Other suitable connectors may include a hook and loop fastener, a zipper, a locking channel, and the like. An example of a "locking channel" is a flexible sewable material that snaps or inserts together (similar to a zip lock bag), or slides in from one end and locks the pieces together.

Preferably, the shipping section 16 is constructed of a protective material that may be more durable than the cover section 12 to protect the boat from travel conditions. An exemplary material is a high quality solution dyed polyester water repellant fabric that is used on the main portion of the cover.

Figure 3:
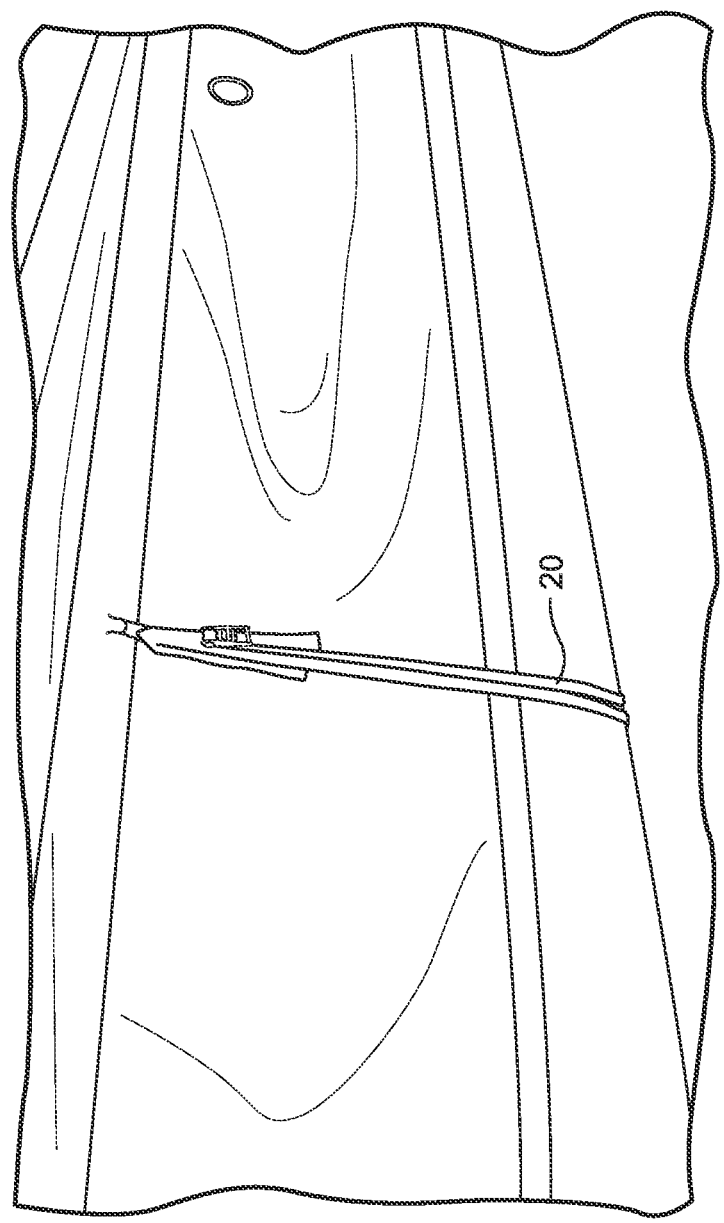
FIG. 3 shows safety straps incorporated in the cover for highway speeds during trailering.

The cover 10 is tensioned under the rub rail 14 and also under the chine 18 of the boat via safety straps 20 (FIG. 3). This double fastening system (one under the rub rail and one under the boat chine) secures the cover 10 for shipping, and heat shrinking is not required before shipping by the manufacturer.

Figure 4:
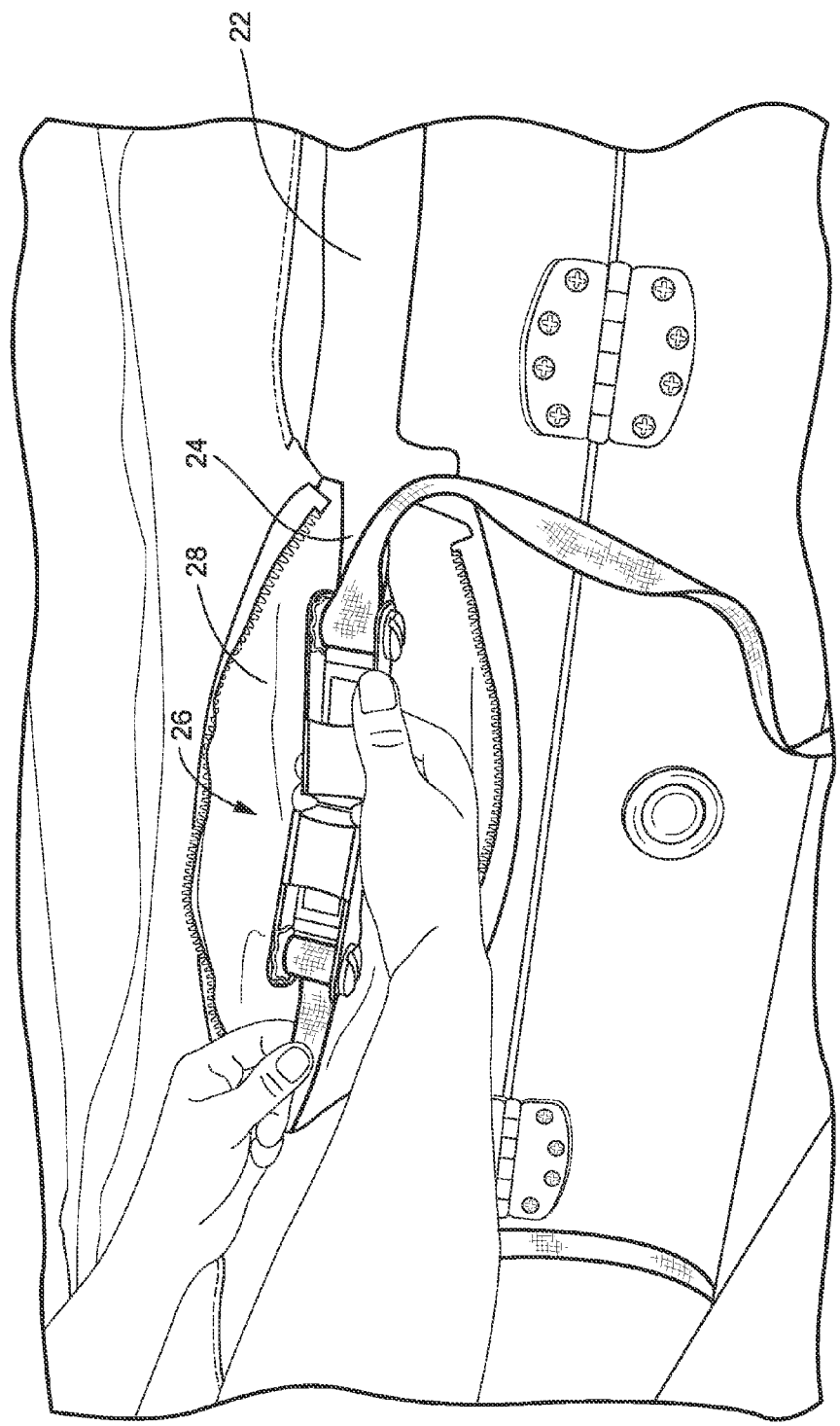
FIG. 4 shows a ratchet tensioning mechanism used for securing the cover on the boat.
Figure 5:
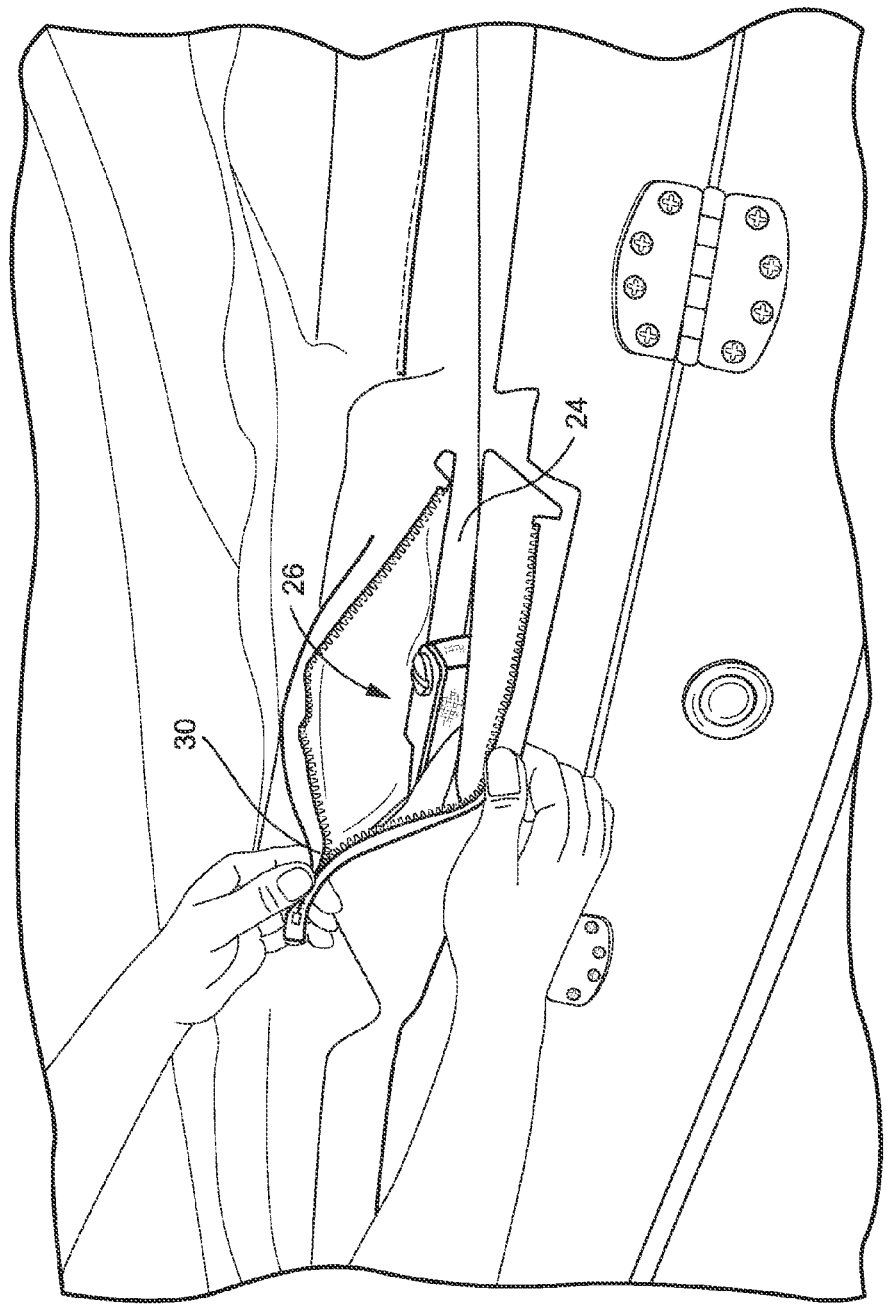
FIG. 5 shows a zippered access opening adjacent the ratchet tensioning mechanism.
Figure 6:
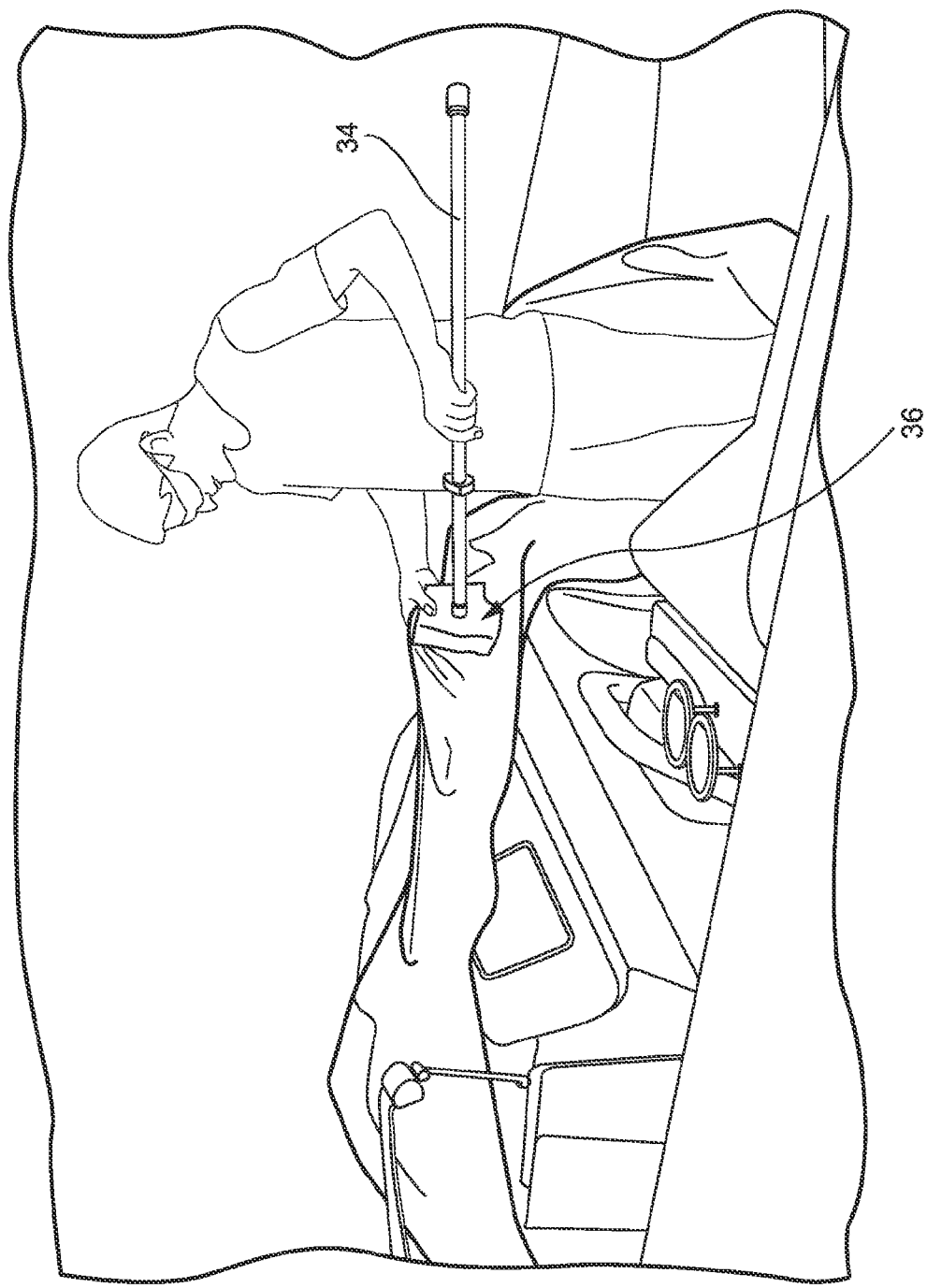
FIG. 6 shows a telescoping support pole insertable into an integrated sleeve in the boat cover.

With reference to FIGS. 4 and 5, the cover section 12 includes a tie channel 22 adjacent an outer periphery thereof. The boat cover is provided with a tension tie 24 that is disposed in the tie channel 22 and a ratchet tensioning mechanism 26 cooperable with the tension tie 24. An exemplary ratchet tensioning mechanism is a come-along or the like. As shown, the tie channel 22 is positioned relative to the cover section 12 such that the tie channel 22 is positionable under the rub rail 14. The tie channel 22 includes an access opening 28 adjacent the ratchet tensioning mechanism 26 that is closable via a zipper 30. The cover 10 is thus designed to fit tightly under the rub rail 14 without snaps or other fasteners. The structure enables the cover to be installed in the water in minutes and held tight with the ratchet tensioning mechanism 26.

When tensioned properly, the cover can be used under high speed road conditions. The safety straps 20 secure the connection for extreme highway speeds. The cover serves to protect the boat and everything inside the boat when traveling.

The cover section 12 includes an integrated brow 32 on the front, which facilitates installation of the cover. With the brow 32, the cover automatically registers itself on the bow of the boat, preventing it from slipping off. On pulling the cover to the stern of the boat, a telescoping support pole 34 is inserted into an integrated sleeve 36 in the cover for quick and easy installation. In an exemplary construction, inside the sleeve 36 is a mushroom cap that evenly distributes the tension off the pole 34. The pole 34 locks into the integrated mushroom cap sewn into the cover, therefore not allowing the pole to fall out.

Preferably, the cover includes zippered cleat cut-outs giving ample room for any cleat factory installation and for tying off the boat if moored in the water. The cover may be vented to bring air into the boat and allow cover breathability. In some embodiments, cut-outs may be provided for factory-installed bimini tops (FIG. 1), allowing the end consumer to easily install a cover without having to take off or lay down the bimini inside the boat, thus eliminating extra work, potential upholstery damage, and time it takes to install the cover.

The cover of the described embodiments replaces the typical disposable plastic shipping cover used currently with virtually every boat from the factory. The reduction in waste of materials is eco-friendly, and added value in the cover is achieved as it can be used by the consumer as a standard storage cover.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A boat cover for a boat including a hull extending from a rub rail to a chine and a deck, the boat cover comprising:
    a cover section that is sized to cover the deck from bow to stern and extending over the rub rail; and
    a shipping section attached to the cover section and sized to cover the hull from below the rub rail toward the chine, wherein the shipping section is removable from the cover section, wherein the cover section comprises a tie channel adjacent a periphery thereof, and wherein the boat cover further comprises a tension tie disposed in the tie channel and a ratchet tensioning mechanism cooperable with the tension tie.

2. A boat cover according to claim 1, wherein the shipping section is constructed of a material that is more durable than the cover section.

3. A boat cover according to claim 1, wherein the shipping section is attached to the cover section by a connector.

4. A boat cover according to claim 3, wherein the connector comprises a sewn seam.

5. A boat cover according to claim 3, wherein the connector comprises one of a hook and loop fastener, a zipper, and a locking channel.

6. A boat cover according to claim 1, wherein the tie channel is positioned relative to the cover section such that the tie channel is positionable under the rub rail.

7. A boat cover according to claim 1, wherein the tie channel comprises an access opening adjacent the ratchet tensioning mechanism.

8. A boat cover according to claim 7, wherein the access opening is closable via a zipper.

9. A boat cover according to claim 1, further comprising safety straps extending from the cover section laterally underneath the hull.

10. A boat cover according to claim 1, wherein the cover section further comprises an integrated brow on a bow end thereof.

11. A boat cover for a boat including a hull extending from a rub rail to a chine and a deck, the boat cover comprising:
    a cover section that is sized to cover the deck from bow to stern and extending over the rub rail; and
    a shipping section attached to the cover section and sized to cover the hull from below the rub rail toward the chine, wherein the shipping section is removable from the cover section, wherein the cover section further comprises an integrated sleeve containing a mushroom cap, and wherein the boat cover further comprises a support pole positionable in the integrated sleeve in engagement with the mushroom cap.

12. A boat cover according to claim 1, wherein the cover section comprises cleat cutouts.

13. A boat cover according to claim 1, wherein the cover section is vented.

14. A boat cover for a boat including a hull extending from a rub rail to a chine and a deck, the boat cover comprising:
    a cover section that is sized to cover the deck from bow to stern and extending over the rub rail; and
    a shipping section attached to the cover section and sized to cover the hull from below the rub rail toward the chine, wherein the shipping section is removable from the cover section, and wherein the cover section comprises cutouts for factory-installed bimini tops.

15. A two-section boat cover for use in shipping and covering a boat, the two-section boat cover comprising:
    a cover section that is sized to cover a boat deck from bow to stern and extending to a mid-section of a boat hull; and a shipping section attached to the cover section and sized to cover the hull from below the mid-section of the boat hull toward a chine of the boat, wherein the shipping section is removable from the cover section, the cover section including a tie channel adjacent a periphery thereof, wherein the boat cover further comprises a tension tie disposed in the tie channel and a ratchet tensioning mechanism cooperable with the tension tie.

16. A two-section boat cover according to claim 15, wherein the shipping section is attached to the cover section by a connector.

17. A two-section boat cover according to claim 16, wherein the connector comprises a sewn seam.

18. A method of using a multi-use boat cover for shipment and storage of a boat including a hull extending from a rub rail to a chine and a deck, the method comprising:

(a) preparing the boat for shipping by:
   securing a cover section over the deck from bow to stern and positioning a periphery of the cover section over the rub rail, and at the same time, securing a shipping section over the hull from below the rub rail toward the chine, wherein the shipping section is removable from the cover section; and (b) when shipping is complete, preparing the boat for display, sale or use by:
   separating the shipping section from the cover section, and continuing to use the cover section as a mooring or trailering boat cover, wherein the cover section comprises a tie channel adjacent a periphery thereof, and the multi-use boat cover further comprises a tension tie disposed in the tie channel and a ratchet tensioning mechanism cooperable with the tension tie, wherein step (a) is practiced by tensioning the tension tie under the rub rail with the ratchet tensioning mechanism.

* * * * *